Sept. 2, 1969                  W. H. URBACH                    3,464,289
                    AUTOMATIC RELEASABLE MACHINE CRANK HANDLE
Filed July 28, 1967                                       3 Sheets-Sheet 1

INVENTOR.
William Henry Urbach

Sept. 2, 1969         W. H. URBACH         3,464,289
AUTOMATIC RELEASABLE MACHINE CRANK HANDLE
Filed July 28, 1967                      3 Sheets-Sheet 2
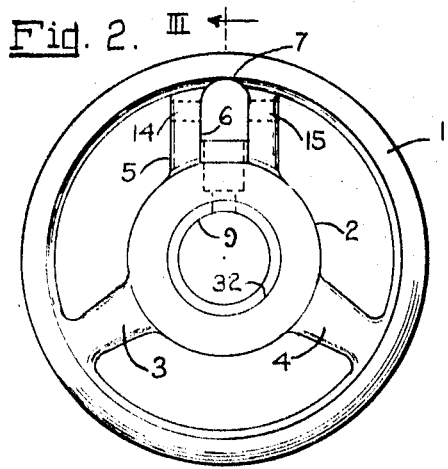
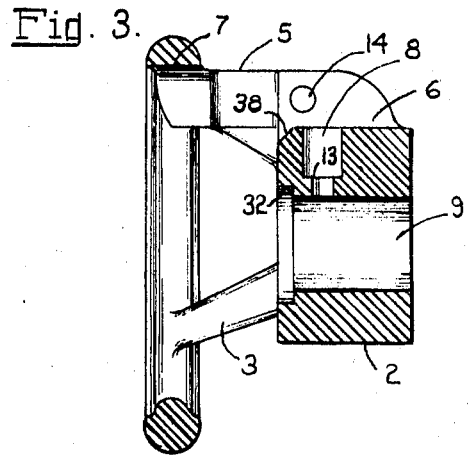
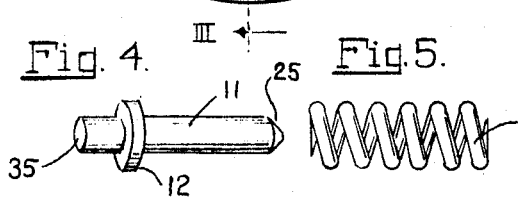
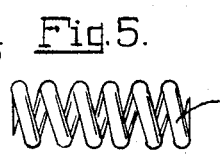
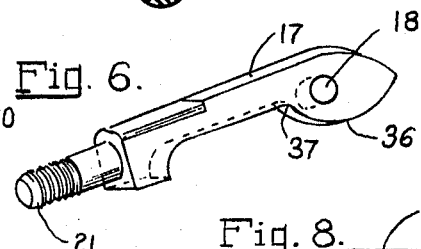
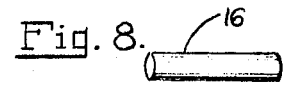
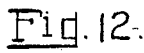
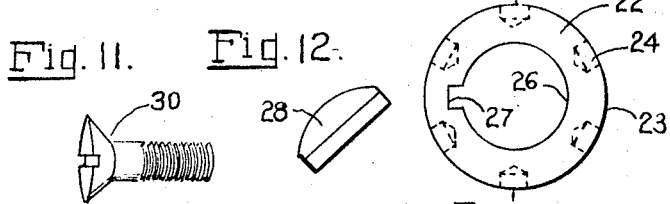
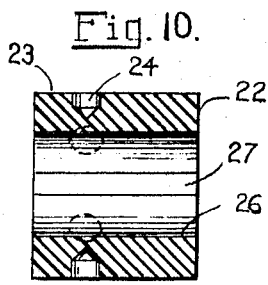
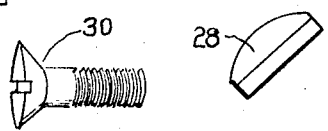
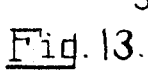
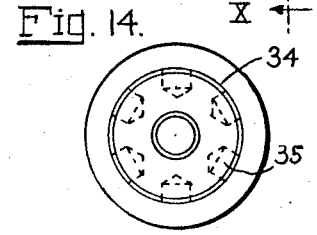
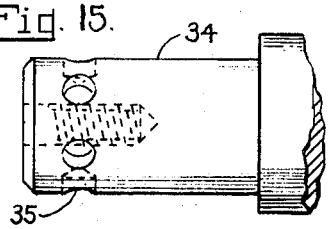
INVENTOR.
William Henry Urbach Sept. 2, 1969  W. H. URBACH  3,464,289
AUTOMATIC RELEASABLE MACHINE CRANK HANDLE
Filed July 28, 1967  3 Sheets-Sheet 3
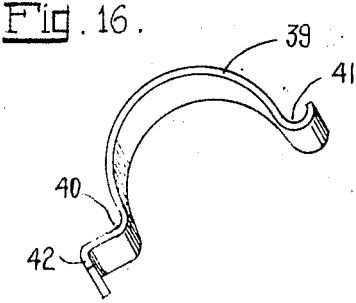
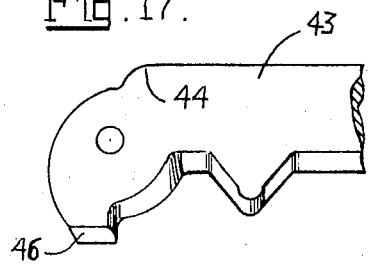
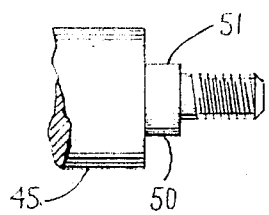
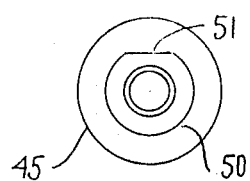
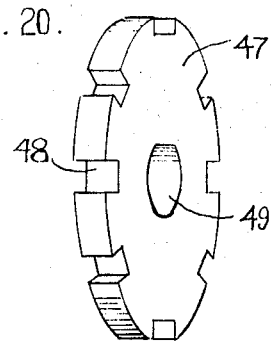
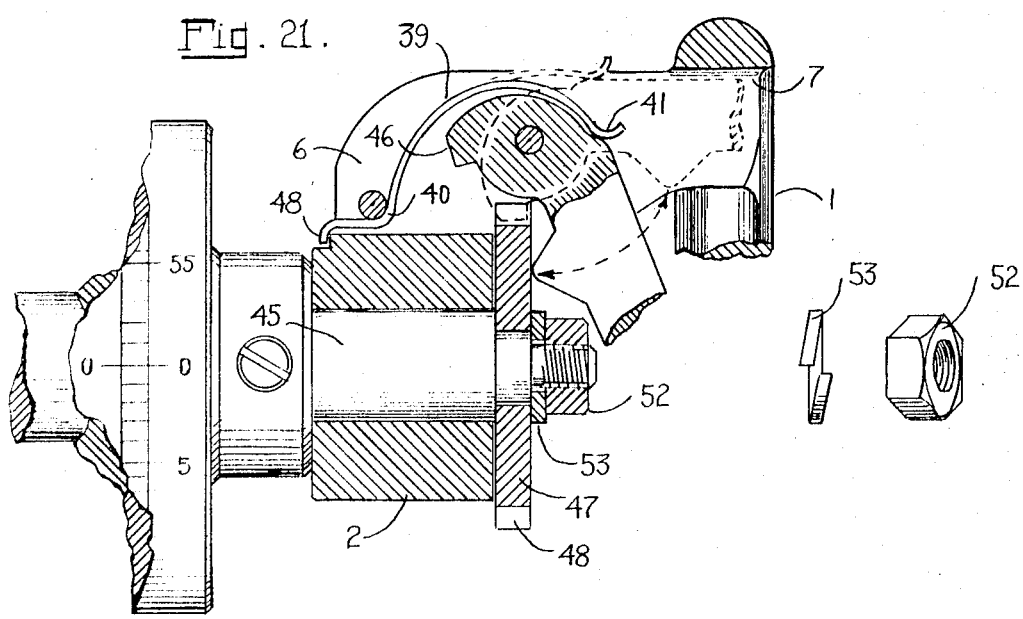
INVENTOR.
William Henry Urbach United States Patent Office 3,464,289
Patented Sept. 2, 1969

3,464,289
AUTOMATIC RELEASABLE MACHINE
CRANK HANDLE
William H. Urbach, Minetto, N.Y.
(R.F.D. 5, Oswego, N.Y. 13126)
Filed July 28, 1967, Ser. No. 657,477
Int. Cl. G05g 1/12
U.S. Cl. 74—547                    4 Claims

ABSTRACT OF THE DISCLOSURE

This invention relates to improvements in an automatic releasable crank device in connection with a machine adjustment spindle such as a shaft or screw used to operate and locate one machine member in relation to another, said device comprising in combination a crank body preferably of the wheel type, provided with an inner cylindrical wall formed to rotably slide over a portion of said spindle having means for retaining said crank, a crank detenting means characterized by a plurality of spaced apart detent shoulders circumferentially located over said spindle to engage an adjustable spring pressed lock member inserted into an apertured portion of the crank hub of which a portion is also provided with means to support a pivotally mounted lever handle that can swing from outer crank position to position adjacent the hub axis, a portion of the lever is formed to facilitate a cooperable connection with said lock member, so that when the lever handle is swung out to cranking position the leverage will overcome spring tension resistance and urge the lock member to engage said detent shoulders and lock the crank, and when cranking force is removed the spring tension will operate to automatically swing the handle adjacent the hub axis and release the crank idle in relation to the spindle.

---

In a second modified embodiment the aforesaid disclosure is further simplified by providing a spring member mounted to permit direct contact with said lever handle provided with a member portion formed integral thereof to directly engage said detent shoulders located around a circular crank detenting member centrally apertured to provide a nonrotatable secure fastening means to said spindle.

A primary object of this invention is to provide an improved crank device that can reduce the cost of "rejects" in the production of machined parts by preventing accidental disturbance in the location of one machine member in relation to another.

A further object is to provide a crank handle having leverage to reduce spring tension resistance to the operator when cranking is in progress.

A further object is to provide a crank device with an adapter that can be readily secured to the crank portion of a machine spindle or screw to simplify replacement of another type handle.

Several embodiments of my crank device are represented in the accompanying drawings in which FIG. 1 represents an enlarged perspective assembly view partly in cross section and a graduated fragment of a machine adjustment dial.

FIG. 2 illustrates an outer end view of the crank body.

FIG. 3 is a cross section taken in plane of the line III—III of FIG. 2.

FIG. 4 is a perspective side view of a lock member.

Figure 1:
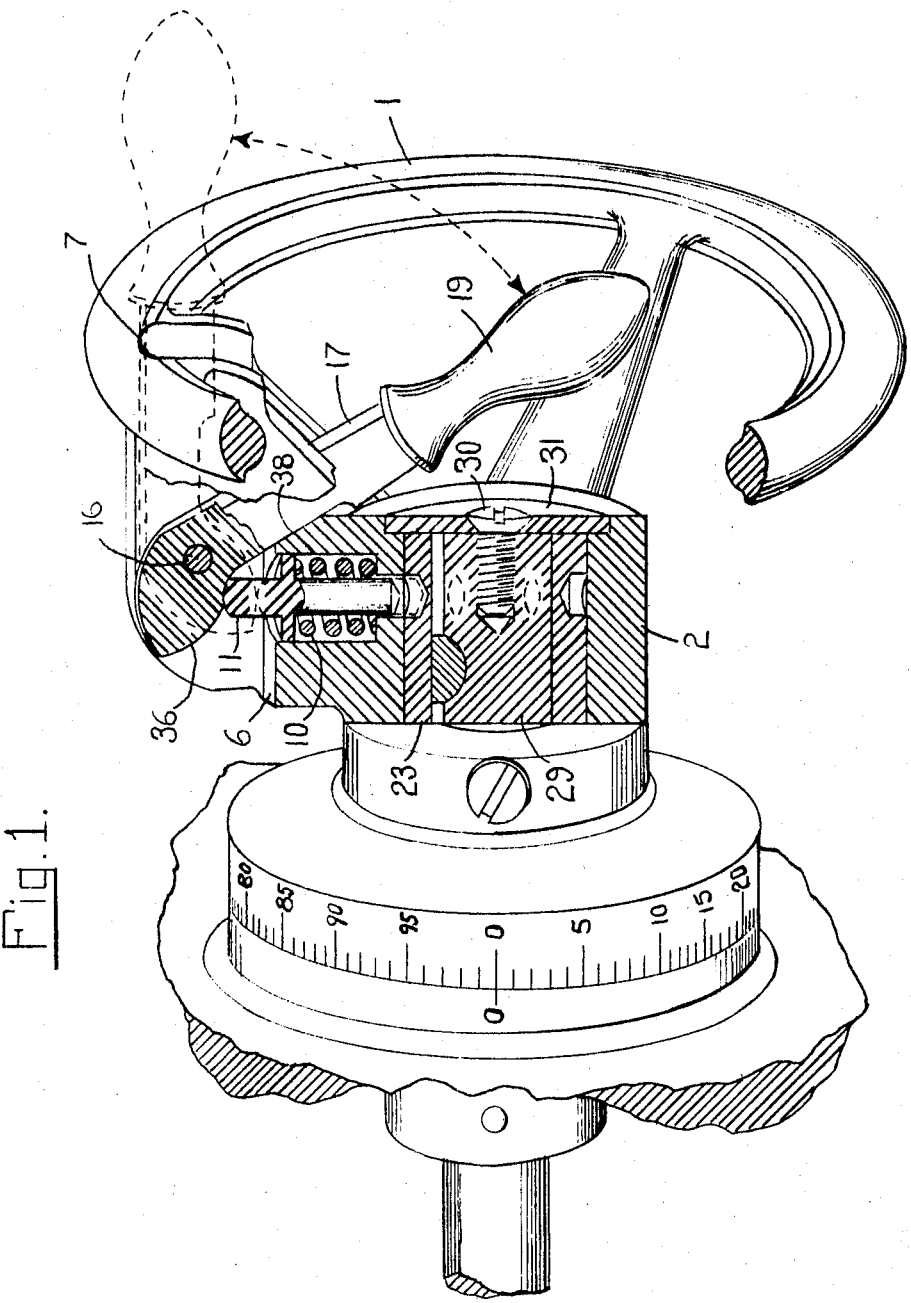

FIG. 5. shows a compressible coil spring.

FIG. 6 is a perspective side view of a lever handle provided with a cam end.

FIG. 7 is a perspective side view of the handle.

FIG. 8 is a pivot dowel pin.

FIG. 9 illustrates the end view of a shaft adaptor bushing.

FIG. 10 represents a cross section taken in plane of the line X—X of FIG. 9.

FIG. 11 is a perspective view of a retainer screw.

FIG. 12 is a perspective view of a key.

FIG 13 represents a perspective cross section view of a hub retainer.

FIG. 14 represents an end view of a machine adjustment shaft.

FIG. 15 represents a fragmentary side view of FIG. 14.

The crank body in the present instance is a spoked bell type, the wheel rim of which is denoted by 1 connected and supported to the hub 2 by angular disposed spokes 3 and 4 and also an extended hub member 5 connected to the inner wheel rim 1 a slot 6 is provided in the hub member 5 extending longitudinally with the hub axis and through the rim 1 so as to present a yoke 7.

A counterbored aperture 8 centrally located in relation to the slot 6 extending from the slot bottom through the inner cylindrical hub wall 9, is provided to support a compressable coil spring 10, formed to engage a slidable lock member 11 having a flange 12 to facilitate a spring tension between 12 and the aperture shoulder 13.

The slot walls have two opposite disposed apertures 14 and 15 in equal spaced relation to securely embrace the pivot pin 16, which is located so that when the lever 17 is inserted into the slot 6 and the pin 16 is inserted through aperture 18, the lock member portion 35 can co-act to urge the lever portion 36 to adjust the handle to automatically withdraw adjacent the hub axis and automatically withdraw the lock member portion 25 inside the hub wall 9 thereby allowing the spring pressed lock member at 35 to rest at 37 and hub 38 to maintain stability and allow the crank to rotate idle in relation to the shaft.

The crank body is retained by the disc washer 31 and screw 30 adaptable to the internal threaded shaft end illustrated in FIG. 1. To adjust the crank lever handle to operative position, the handle is swung outward by slightly rotating the crank so that the leverage of the handle lever will compress the spring 10 and press the lockmember end 35 to urge the lockmember end 25 to engage the detent shoulders of the shaft or shaft adaptor 24 indented to facilitate detenting rotative crank movement shown by dotted phantom lines illustrated in FIG. 1.

I also attain the same result in the production of a modified embodiment in which FIG. 16 illustrates a perspective view of a bow spring.

FIG. 17 illustrates a fragmentary prespective view of the lever handle having a lock member portion formed thereof.

FIG. 18 illustrates a fragmentary side view of a shaft.

FIG. 19 illustrates an end view of FIG. 18.

FIG. 20 illustrates a perspective view of a crank hub retainer provided with detent shoulders.

FIG. 21 illustrates an assembly view partly in cross section and also showing a fragment of a graduated shaft adjustment member.

The principle in this modified embodiment is similar to FIG. 1 except that the lever and hub retainer are formed so that alternative lever position will co-act to facilitate automatic nondetent and detenting engagement in relation to the crank and shaft.

The lever is pressed by a bow spring 39 with opposite crimped ends 40 and 41, a portion extending from 40 is also crimped downward at 42.

When the spring 39 is inserted into the crank body slot 6 allowing clearance between the slot walls, the spring is pressed down and a pin similar to the pivot pin 16 is secured transversly through the slot walls located to allow the crimp 40 to snugly engage the pin and press 42 to the hub exerting pressure on the lever 43 at the back 44 so as to automatically urge the lever to withdraw adjacent the hub axis.

When the crank hub 2 is mounted to the shaft 45 to rotate freely, the lever 43 provided with a lock member 46 formed integral thereof, can be swung out adjacent the crank rim yoke 7.

The hub retainer 47 having a plurality of detent shoulders 48 circumferentially spaced apart are formed adaptable to freely engage the lock member 46. An aperture 49 centrally located into 47 formed to nonrotatably engage the shaft at 50 and 51 can be mounted thereon and secured in the present instance by a threaded shaft end, a nut 52 and lock washer 53.

It will be noted that spring tension resistance to the operator is reduced in the aforesaid manner as illustrated in FIG. 1 and FIG. 21.

The graduated adjustable dial member shown in FIG. 1 and FIG. 21 is intended to illustrate how the crank device can be used to adjust one machine member in relation to another.

It is of course obvious to a machinist that it can be readily applied to many variable mechanical movements, such as for example, a lead screw, or worm and gear that is commonly used to adjust one machine member in location to another.

From the above description it will be seen that I have provided a crank device that is very simple and inexpensive to manufacture.

While I have shown and described several preferred embodiments of the crank device, I do not wish to limit myself to the exact form shown, since the particular construction herein described is intended illustrative rather than delimitative of the invention.

What I claim as new and desire to secure by Letters Patent is:

1. An automatic releasable crank device in cooperation with a machine adjustment spindle comprising in combination a crank body provided with an inner cylindrical wall rotatably mounted over said spindle, means retaining said crank, and means detenting said crank characterized by a plurality of circumferentially spaced apart detent shoulders located around said spindle to engage an adjustable crank lock member, a crank hub means mounting said lock member, and means to support a pivotally mounted spring pressed lever handle having a portion formed to facilitate cooperable connection with said lock member, said lever mounted to be swung out to cranking position and automatically swing to position adjacent the hub axis allowing alternative lever position to lock and release said crank idle in relation to said spindle.

2. In combination with the subject matter of claim 1 and further including an adaptor bushing, centrally apertured to secure a nonrotatable mounting over a crank portion of said spindle, the outside diameter of said bushing provided with said detent shoulders, is also formed to rotatably mount said crank thereon.

3. An automatic releasable crank device in cooperation with a machine adjustment spindle comprising in combination a crank body provided with an inner cylindrical wall rotatably mounted over said spindle, means mounting and retaining said crank, means for detenting said crank characterized by a plurality of circumferentially spaced apart detent shoulders located around said spindle to engage an adjustable lock member supported by a compressable coil spring mounted into an apertured portion of said crank of which a portion is also provided with means mounting a pivotally connected lever handle having a cam portion formed to facilitate cooperable relation to said lock member, said lever pivoted to overcome spring tension and lock said crank when swung out to cranking position and also allow the lever to swing automatically to position adjacent the crank axis and release the crank to idle in relation to said spindle.

4. An automatic releasable crank device in cooperation with a machine adjustment spindle, comprising in combination a crank body provided with an inner cylindrical wall rotatably mounted over said spindle means retaining said crank including a circular disc apertured to provide a nonrotatable secure mounting to said spindle, a detenting means characterized by a plurality of circumferentially spaced apart detent shoulders located around said disc, a hub portion of said crank having means to support a pivotally mounted spring pressed lever handle that can swing from outer crank position to position adjacent hub axis, a portion of said lever is formed to engage said detent shoulders and lock said crank when cranking is in progress and when cranking force is removed automatically swing said handle adjacent the hub axis and release the crank to idle.

References Cited
UNITED STATES PATENTS

| | | | |
|---|---|---|---|
| 1,274,471 | 8/1918 | Todd | 74—547 XR |
| 1,348,193 | 8/1920 | Wenderhold | 74—547 |
| 1,841,573 | 1/1932 | Camp | 74—547 XR |
| 3,383,945 | 5/1968 | Carella | 74—547 |

FRED C. MATTERN, Jr., Primary Examiner

F. D. SHOEMAKER, Assistant Examiner

UNITED STATES PATENT OFFICE
CERTIFICATE OF CORRECTION

Patent No. 3,464,289 September 2, 1969

William H. Urbach

It is certified that error appears in the above identified patent and that said Letters Patent are hereby corrected as shown below:

In the drawings, Figures 14 and 15, "35" should read -- 24 -- and "34" should read -- 29 --. Figures 9 and 10, "22" should be omitted. Figure 21, "48", upper occurrence, should read -- 42 --.

Signed and sealed this 6th day of October 1970.

(SEAL)
Attest:

Edward M. Fletcher, Jr.         WILLIAM E. SCHUYLER, JR.
Attesting Officer                    Commissioner of Patents